United States Patent [19]
Tanaka

[11] Patent Number: 4,640,588
[45] Date of Patent: Feb. 3, 1987

[54] STEREOSCOPIC MICROSCOPE INCLUDING A ROTATABLE LIGHT BEAM DISTRIBUTING MEANS WITH A SURFACE HAVING DISTRIBUTING AND NON-DISTRIBUTING AREAS

[75] Inventor: Shinya Tanaka, Tokyo, Japan

[73] Assignee: Canon Kabushiki Kaisha, Tokyo, Japan

[21] Appl. No.: 819,306

[22] Filed: Jan. 16, 1986

[30] Foreign Application Priority Data

Jan. 25, 1985 [JP] Japan ................................. 60-13162

[51] Int. Cl.$^4$ ..................... G02B 21/22; G02B 27/14
[52] U.S. Cl. ................................. 350/516; 350/511; 350/522; 350/171
[58] Field of Search ............... 350/513, 514, 515, 516, 350/511, 522, 507, 502, 172, 173, 171, 287, 286, 145, 146

[56] References Cited

U.S. PATENT DOCUMENTS 2,439,526  4/1948  Ott ........................................ 350/522
4,138,191  2/1979  Peyman et al. ...................... 350/502
4,341,435  7/1982  Lang et al. ........................... 350/523

FOREIGN PATENT DOCUMENTS 1217099  5/1966  Fed. Rep. of Germany ...... 350/516

Primary Examiner—Jon W. Henry
Attorney, Agent, or Firm—Fitzpatrick, Cella, Harper & Scinto

[57] ABSTRACT

A stereoscopic microscope has an objective optical system used in common for left and right observation optical paths, a pair of left and right first stereoscopic observation optical systems disposed rearwardly of the objective optical system, a light beam distributing device disposed between the first stereoscopic observation optical systems and the objective optical system rotatable about the optic axis of the objective optical system, and at least deflecting a second stereoscopic observation light beam passed through the objective optical system, and a second stereoscopic observation optical system rotatable about the optic axis of the objective optical system with the rotation of the light beam distributing device, the second stereoscopic observation light beam passed through the light beam distributing device entering the second stereoscopic observation optical system.

10 Claims, 10 Drawing Figures

FIG. 5B
FIG. 5A
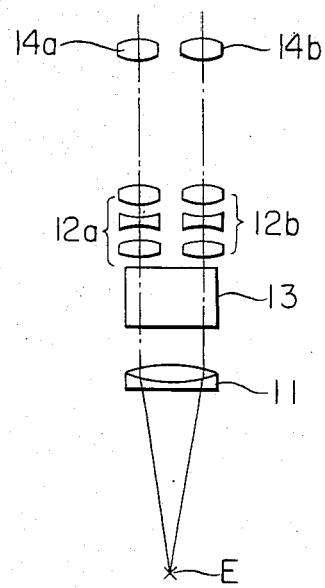
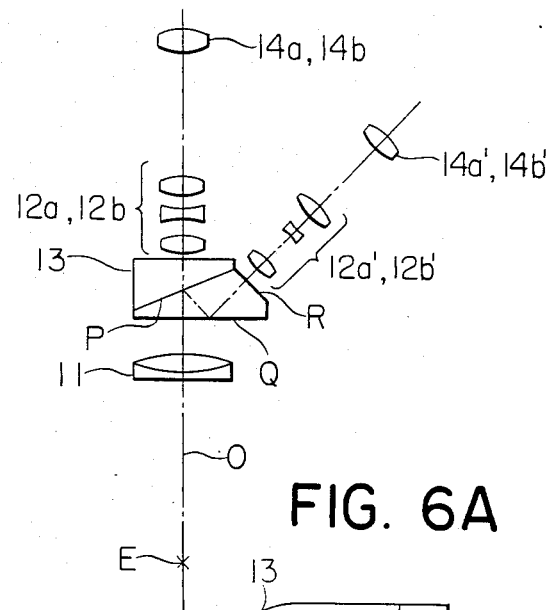
FIG. 6A
FIG. 7A
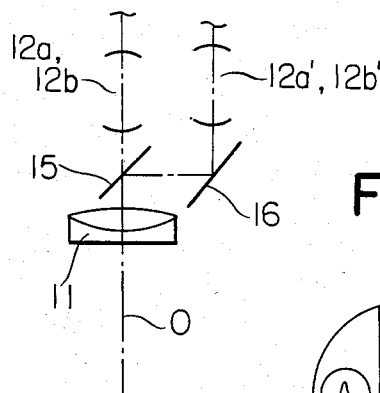
FIG. 7B
FIG. 6B
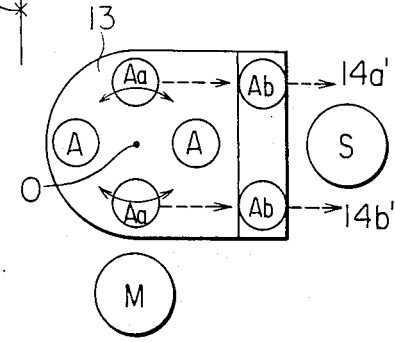
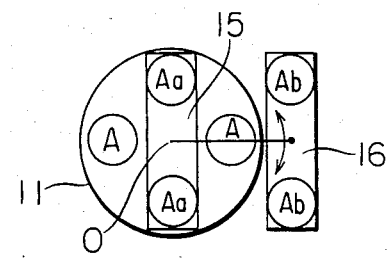
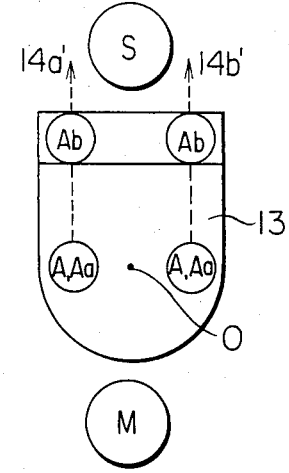

STEREOSCOPIC MICROSCOPE INCLUDING A ROTATABLE LIGHT BEAM DISTRIBUTING MEANS WITH A SURFACE HAVING DISTRIBUTING AND NON-DISTRIBUTING AREAS

BACKGROUND OF THE INVENTION

1. Field of the Invention

This invention relates to a stereoscopic microscope, for example, a microscope for ophthalmic operations or the like, and more particularly to a stereoscopic microscope provided with a second stereoscopic observation optical system for quickly and competently assisting an operator during an operation.

2. Description of the Prior Art

Stereoscopic microscopes are widely used for medical treatments such as operations and examination s and in research and medical industries. n operations, they are useful to improve the degree of precision and safety thereof.

Generally, when an operation is to be effected by the use of a microscope for operation, an assistant assists an operator while observing the patient from beside the operator. Therefore, it is necessary for the assistant to constantly stereoscopically observe the same affected part that the operator observes. However, with the conventional stereoscopic microscope of this type, it is often the case that an observation optical system for the assistant from the operator's direction of observation or stereoscopic observation is impossible. With the device disclosed in the Japanese Utility Model Publication No. 39364/1980 which eliminates this problem, the assistant can obtain stereoscopic observation substantially similar to what the operator has. In this case, however, the assistant can only position himself in a predetermined direction relative to the operator and the assistant's range of movability is limited. Improving this limitation of the range of movability has been proposed, but the achieved range of movability is not yet satisfactory.

FIG. 1 of the accompanying drawings shows an optical system of a microscope for operation according to the prior art. The affected part E is stereoscopically observed by the operator from two eyepieces 4a and 4b through an objective 1, two sets of zoom lenses 2a and 2b and beam splitters 3a and 3b. On the other hand, the assistant observes the affected part E from a direction L' entirely different from the operator's direction of observation between the affected part E and the objective 1, or observes the affected part E from one direction L of the left and right observation systems through the beam splitter 3b while separating the light beam.

FIG. 2 of the accompanying drawings shows another example of the prior art in which the assistant also can effect stereoscopic observation. The use areas A in the objective 1 of an observation optical system for operator and the use areas Aa of an observation optical system for an assistant are fixed at positions forming an angle of 90° with each other, as viewed from the direction of the optic axis O of the objective 1. Thus, in these examples of the prior art shown in FIGS. 1 and 2, there arises a problem that the assistant's position cannot be changed.

FIG. 3 of the accompanying drawings shows an example of the prior art proposed to overcome the above-noted disadvantage. In this example, as in the case of FIG. 1, the affected part E is observed by the operator through an objective 1, two sets of zoom lenses 2a and 2b, beam splitters 3a and 3b and eyepieces 4a and 4b. On the other hand, the assistant observes the affected part E through the objective 1, zoom lenses 2a' and 2b', mirrors 5a and 5b and eyepieces 4a' and 4b', (2b', 5band 4b' being not shown), and the use areas Aa in the objective 1 of this observation optical system for assistant are rotatable relative to the optical system for operator, as shown in FIG. 4 of the accompanying drawings. That is, in FIG. 4, relative to the use areas A of the observation optical system for operator, the pair of use ranges Aa and Aa for left and right eyes of the observation optical system for assistant are rotated about the optic axis O of the objective 1.

This example of the prior art, as compared with the two previous examples, is remarkably improved from the viewpoint of the degree of freedom of the assistant's position, but the use areas A and Aa of the two observation optical systems are installed for rotation in the same space and therefore, the range of rotation of the areas Aa relative to the areas A is also limited. Particularly, with microscopic operations in cerebral surgery, it is often the case that the innermost part of a deep hole is observed, and the distance d between the pair of optical systems in FIG. 3 cannot be selected to value greater than necessary and therefore, the range of rotation of the use areas Aa is limited. Also, in recent years, particularly, microscopes which enables objects to be seen brightly and well have been desired with the advanced degree of precision of operations or the like and therefore, it is inappropriate to make the diameter of the zoom lenses 2a and 2b smaller, and this also leads to a disadvantage that the range of rotation of the use areas Aa is limited.

SUMMARY OF THE INVENTION

It is an object of the present invention to provide a stereoscopic microscope in which the mutual directions of observation of two stereoscopic observation optical systems for the same part to be examined can be positioned freely.

BRIEF DESCRIPTION OF THE DRAWINGS

FIGS. 5A and 5B show the construction of a first embodiment of the present invention.

FIGS. 6A and 6B illustrate the light beam distributing means of the first embodiment.

FIG. 7A shows the construction of a second embodiment of the present invention.

FIG. 7B illustrates the light beam distributing means of the second embodiment.

DESCRIPTION OF THE PREFERRED EMBODIMENTS

Figure 1:
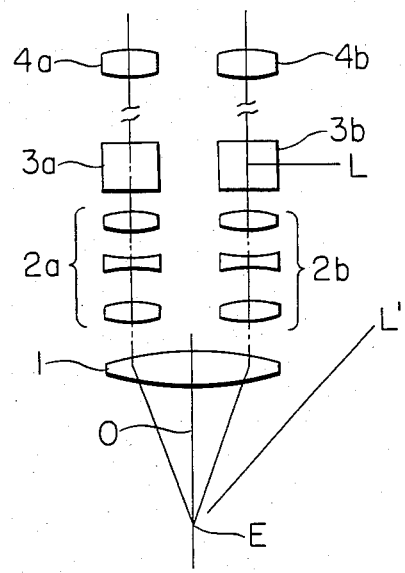
FIG. 1 shows the construction of a first example of the prior art.
Figure 2:
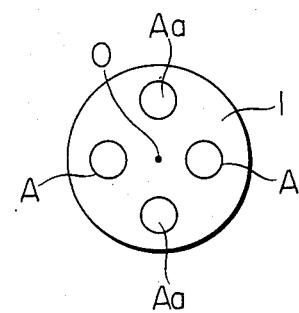
FIG. 2 illustrates a second example of the prior art.
Figure 3:
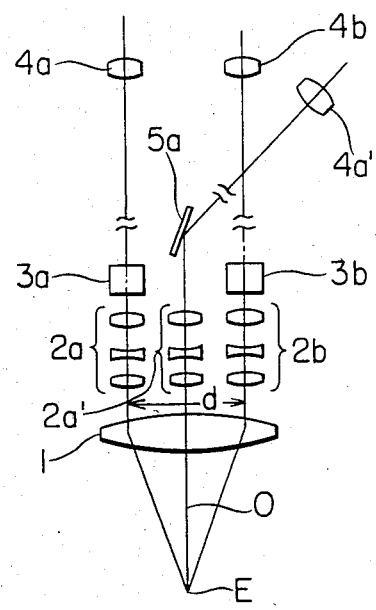
FIG. 3 shows the construction of a third example of the prior art.
Figure 4:
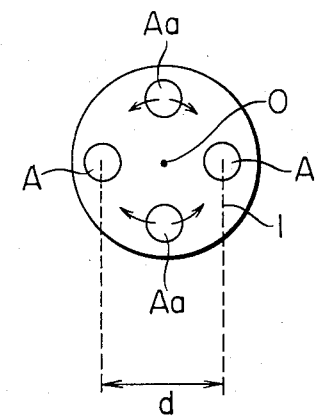
FIG. 4 is an illustration of the third example.

FIGS. 5A and 5B are views of a first embodiment of the present invention as seen from directions orthogonal to each other. In FIGS. 5A and 5B, the construction of a main observation optical system is substantially similar to that of the main observation optical system in the example of the prior art shown in FIG. 1, but a prism type beam splitter 13 rotatable about the optic axis O of an objective 11 is disposed as light beam distributing means between the objective 11 and zoom variable magnification systems 12a, 12b. The main examiner can stereoscopically observe an object E to be examined through the objective 11 whose object side focus is made coincident with the object E to be examined, the beam splitter 13 comprising a combination of two prisms and having the function of partially effecting light beam distribution, the zoom variable magnification systems 12a and 12b disposed in the form of a pair on two left and right parallel optic axes, and eyepieces 14a and 14b.

A light beam distributing surface P inclined with respect to the optic axis O of the objective 11 is formed in the beam splitter 13, and a half-mirror portion is formed only in the two effective use areas Aa (FIG. 6) of the auxiliary observation optical system of the distribution surface P. A light beam reflected by this half-mirror portion is totally reflected by the bottom surface Q of the beam splitter 13, emerges from the two areas Ab of an exit surface R and travels toward the auxiliary observation optical system at an angle of 45° with respect to the optic axis O. Accordingly, in the auxiliary observation optical system as well, the object E to be examined may be stereoscopically observed by the sub-examiner through variable magnification systems 12a' and 12b' optically coupled to the beam splitter 13 and eyepieces 14a' and 14b'.

FIGS. 6A and 6B show the state of the beam splitter 13 as seen from the direction of the optic axis O of the objective 11. The optical path for the main examiner passes through the use area A of the beam splitter 13 and the beam splitter 13 is installed for rotation relative to the center 0 of the objective 11 and thus, the two effective use areas Aa of the auxiliary observation optical system can assume any angle relative to the use area A of the main observation optical system.

FIG. 6A shows a case where the main examiner M and the sub-examiner S observe from positions forming an angle of 90° with respect to each other, and FIG. 6B shows a case where the main examiner M and the sub-examiner S observe from positions forming an angle of 180° with respect to each other. The use areas Aa of the auxiliary observation optical system are the half-mirror portion and therefore, when the use areas A and Aa are coincident with each other as shown in FIG. 6B, the light beam emanating from the object E to be examined is distributed to the main observation optical system and the auxiliary observation optical system by 50% each. Thus, in the other case than the case of FIG. 6B, that is, in the case where the use areas A and Aa are not coincident with each other, 100% of the light beam passes through the use area A of the main observation optical system and 50% of the light beam passes through the use areas Aa of the auxiliary observation optical system.

Accordingly, in the other case than the case of FIG. 6B, the light beam emanating from the object E to be examined passes through the objective 11, whereafter it is transmitted through the use area A of the beam splitter 13 and 100% of the light beam enters the main observation optical system and is observed by the main examiner through zoom lens systems 12a, 12b and eyepieces 14a, 14b. On the other hand, in the auxiliary observation optical system, 50% of the light beam is reflected by the use area Aa of the beam splitter 13, is totally reflected by the bottom surface M of the beam splitter 13, is transmitted through the area Ab of the exit surface N and is observed by the sub-examiner under the quantity of light of 50% through zoom lens system 12a', 12b' and eyepieces 14a', 14b'.

When the use areas A and Aa are coincident with each other as in the case of FIG. 6(b), 50% of the light beam is distributed to each of the main observation optical system and the auxiliary observation optical system and thus, the main examiner M and the sub-examiner S observe the object E to be examined with the same brightness from the same direction. It is also possible to distribute, for example, 70% of the light beam to the main observation optical system and 30% of the light beam to the auxiliary observation optical system so that the light beam is preferentially supplied into the main observation optical system.

In the present embodiment, the beam splitter 13 is thus installed for rotation about the optic axis of the objective 11 with the zoom lens systems 12a', 12b' and eyepieces 14a', 14b' which together constitute the auxiliary observation optical system and therefore, the sub-examiner S can observe at any position, and in the other cases than the case where the main examiner M and the sub-examiner S are at positions forming an angle of 180° with each other, the main examiner M can obtain 100% of the light beam so that the main examiner M can be given a bright observed image.

FIG. 7 shows a second embodiment of the present invention in which a pellicle mirror type beam splitter is used as light beam distributing means. FIG. 7A is a side view of the present embodiment. The object E to be examined may be observed by the sub-examiner through a pellicle mirror 15 installed for rotation about the optic axis O of an objective 11 and a reflecting mirror 16 and zoom lens systems 12a', 12b' installed in the auxiliary observation optical system and rotatable with the pellicle mirror 15.

FIG. 7B shows the pellicle mirror 15 and the reflecting mirror 16 as seen from the direction of the optic axis O of the objective 11. Use areas Aa comprising a half-mirror portion are set at the opposite ends of the pellicle mirror 15. The pellicle mirror 15, the reflecting mirror 16 and the auxiliary observation optical system are rotated together about the optic axis O of the objective 11 and therefore, the light beam from the object E to be examined reflected by 50% by the use areas Aa of the pellicle mirror 15 and having its angle changed by the areas Ab of the reflecting mirror 16 is received by the sub-examiner, whereby the object E to be examined can be observed from any direction. As long as the use areas A and Aa are not coincident with each other, the main examiner can utilize 100% of the light beam emanating from the object E to be examined, through a portion in which the pellicle mirror 15 is not present.

This second embodiment not only is advantageous in that it can make the apparatus light in weight, but also the following application thereof is possible. That is, in FIG. 7B, the reflecting mirror 16 is installed at an angle of 45° with respect to the optic axis O of the objective 11 and thus, the sub-examiner observes the object E to be examined from a perpendicular direction, but if, for example, the reflecting mirror 16 is installed at an angle of 67.5° with respect to the optic axis O of the objective 11, the sub-examiner can stereoscopically observe from an angle of 45° with respect to the optic axis O of the objective 11. In addition, by making the angle of inclination of the reflecting mirror 16 variable and forming means for endowing the auxiliary observation optical system with an angle corresponding thereto, observation from any angle also becomes possible.

Also, in the first embodiment, in order to enable the examiners to assume easy observation postures, the auxiliary optic axis formed by the prism type beam splitter 13 is inclined by 45° with respect to the optic axis of the objective 11, but by changing the inclination of the light beam distributing surface P as required and selecting the shape of the prism type beam splitter 13, the object E to be examined can be observed at any other angle. However, the use of the prism type beam splitter having the shape as shown in FIG. 5 is considered to be more advantageous from the viewpoint that the apparatus is made light in weight and the examiners can assume easy observation postures.

In a microscope such as a microscope for operation in which it is necessary to distinguish between the main and the sub, the system for partially forming a half-mirror on the light beam distributing surface is better, but in a case where the present invention is applied to a microscope such as a stereoscopic microscope for education which requires a plurality of equal observation optical systems, it is also possible to form half-mirrors on the entire light beam distributing surface P of the prism type beam splitter 13 and have the whole surface of the pellicle mirror 15 widened in area to enable observation from any direction with the same brightness.

What I claim is:

1. A stereoscopic microscope having:
   an objective optical system used in common for left and right observation optical paths;
   a first stereoscopic observation optical system having left and right observation optical paths, disposed rearwardly of said objective optical system;
   light beam distributing means disposed between said first stereoscopic observation optical system and said objective optical system and rotatable about the optic axis of said objective optical system; and
   a second stereoscopic observation optical system rotatable about the optic axis of said objective optical system with the rotation of said light beam distributing means;
   wherein said light beam distributing means is provided with a light beam distributing surface, and said light beam distributing surface has a light beam distributing area for distributing light received thereon to said second stereoscopic observation optical system, and said light beam distributing surface also has a non-distributing area for transmitting light received thereon to said first stereoscopic observation optical system.

2. A stereoscopic microscope according to claim 1, wherein said light beam distributing area coincides with the optical path of said second stereoscopic observation optical system.

3. A stereoscopic microscope according to claim 1, wherein said light beam distributing area is a half-mirror.

4. A stereoscopic microscope according to claim 1, wherein said light beam distributing means is a prism type beam splitter.

5. A stereoscopic microscope according to claim 1, wherein said light beam distributing surface distributes light received thereby along the optical path of said second stereoscopic observation optical system so as to be received by said second stereoscopic observation optical system and distributes light received thereby along an optical path commonly shared by said first and second stereoscopic observation optical system so as to be received by said first stereoscopic observation optical system.

6. A stereoscopic microscope according to claim 3, wherein said light beam distributing means is a pellicle mirror type beam splitter.

7. A stereoscopic microscope according to claim 1, further having a reflecting mirror for making the angle of inclination of the optic axis of said second stereoscopic observation optical system variable.

8. A stereoscopic microscope according to claim 1, wherein said light beam distributing means distributes 50% of the light beam received thereby to said first stereoscopic observation optical system and 50% of the light beam received thereby to said second stereoscopic observation optical system.

9. A stereoscopic microscope according to claim 6, wherein said light beam distributing surface distributes light received thereby along the optical path of said second stereoscopic observation optical system so as to be received by said second stereoscopic observation optical system and distributes light received thereby along an optical path commonly shared by said first and second stereoscopic observation optical systems so as to be received by said first stereoscopic observation optical system.

10. A stereoscopic microscope according to claim 1, wherein said light beam distributing means distributes over 50% of the light received thereby to said first stereoscopic observation optical system and less than 50% of the light received thereby to said second stereoscopic observation optical system.

* * * * *

UNITED STATES PATENT AND TRADEMARK OFFICE
CERTIFICATE OF CORRECTION

PATENT NO. : 4,640,588
DATED : February 3, 1987
INVENTOR(S) : SHINYA TANAKA

It is certified that error appears in the above-identified patent and that said Letters Patent is hereby corrected as shown below:

IN THE TITLE AT [54]

Line 2, "ROTATABLELIGHT" should read --ROTATABLE LIGHT--.

COLUMN 6

Line 18, "system" should read --systems--.

Signed and Sealed this

Eighth Day of September, 1987

Attest:

DONALD J. QUIGG

Attesting Officer

Commissioner of Patents and Trademarks